US012638845B2

(12) United States Patent
Pawar et al.

(10) Patent No.: US 12,638,845 B2
(45) Date of Patent: May 26, 2026

(54) SYSTEM AND METHOD OF MONITORING PAYLOAD VOLUME UTILIZATION ON A WORK VEHICLE

(71) Applicant: Deere & Company, Moline, IL (US)

(72) Inventors: Sanket Pawar, Pune (IN); Jeffery R. Kreiling, Benton, WI (US); Dnyaneshwar J. Jagtap, Dhule (IN); Amol Dhamale, Pune (IN)

(73) Assignee: DEERE & COMPANY, Moline, IL (US)

( * ) Notice: Subject to any disclaimer, the term of this patent is extended or adjusted under 35 U.S.C. 154(b) by 967 days.

(21) Appl. No.: 17/658,177

(22) Filed: Apr. 6, 2022

(65) Prior Publication Data

US 2023/0324909 A1      Oct. 12, 2023

(51) Int. Cl.
*G05D 1/00* (2024.01)
*G06V 20/56* (2022.01)

(52) U.S. Cl.
CPC ......... *G05D 1/0094* (2013.01); *G05D 1/0044* (2013.01); *G06V 20/56* (2022.01)

(58) Field of Classification Search
CPC ..... G05D 1/0094; G05D 1/0044; G06V 20/56
See application file for complete search history.

(56) References Cited

U.S. PATENT DOCUMENTS

| | | | |
|---|---|---|---|
| 4,913,551 A | 4/1990 | Davis | |
| 10,889,962 B2 | 1/2021 | Michael Raj et al. | |
| 2005/0066641 A1* | 3/2005 | Huhmarkangas ....... B60P 7/135 56/1 |
| 2011/0298889 A1 | 12/2011 | Seto | |

| | | | |
|---|---|---|---|
| 2019/0048559 A1* | 2/2019 | Olsen ..................... B60K 35/60 |
| 2021/0007295 A1* | 1/2021 | Iyer ........................... B60P 3/41 |
| 2022/0170242 A1* | 6/2022 | Maley ...................... G06T 7/70 |

FOREIGN PATENT DOCUMENTS

| | | |
|---|---|---|
| CA | 2921720 A1 | 8/2016 |
| EP | 3725960 A1 | 10/2020 |
| JP | 2005-027509 A2 | 2/2005 |
| WO | WO 2021005265 A1 | 1/2021 |

OTHER PUBLICATIONS

Finish Office Action issued in application No. 20235108 dated Aug. 16, 2023 (07 pages).
Rahman et al., Image Processing Technique to Count the Number of Logs in a Timber Truck, Researchgate, pp. 1-7, Dec. 2011, [online]. Retrieved from the Internet <URL: https://www.researchgate.net/publication/266630379_Image_Processing_Technique_to_Count_the_Number_of_Logs_in_a_Timber_Truck>.

* cited by examiner

*Primary Examiner* — Jelani A Smith

(57) ABSTRACT

A work vehicle with a grapple volume utilization system comprises a frame, a boom assembly, an image capture device, and a controller. The boom assembly is coupled to the frame wherein the boom assembly includes an arch section pivotally coupled to the frame, a boom section pivotally coupled to the arch section, and a grapple pivotally coupled to the boom section. The image capture device is coupled to one of the frame and the boom assembly wherein the image capture device has a field of view that includes the grapple and is configured to output image data of the grapple. The controller includes a processor and a non-transitory computer readable medium having a program instruction permitting the controller to monitor the grapple arms, calculates a grapple volume utilization based on the image data and performs an action associated with the work vehicle based in part on the grapple volume utilization.

17 Claims, 6 Drawing Sheets

SYSTEM AND METHOD OF MONITORING PAYLOAD VOLUME UTILIZATION ON A WORK VEHICLE

TECHNICAL FIELD

The disclosure generally relates to a work vehicle and a method of monitoring a grapple payload volume utilization system of the work vehicle.

BACKGROUND

Work vehicles are configured to perform a wide variety of tasks for use such as construction machines, forestry machines, lawn maintenance machines, as well as on-road machines such as those used to plow snow, spread salt, or machines with towing capability. Work vehicles such as grapple skidders are used to transport harvested standing trees from one location to another. This transportation typically occurs from the harvesting site to the processing site. The implement for carrying the payload is coupled to the boom assembly that includes multiple pivoting means in each of the x, y, and z directions. Actuators may then be arranged on the boom assembly to pivot the section of the boom assembly relative to each other and thereby move the grapple (i.e. the implement). Furthermore, the implement itself can rotate as felled trees are generally towed with a portion of the tree engaging the ground surface. Controlled movement of the implement can be difficult and thus require a highly skilled operator. Skidders, for example, accumulate felled logs sequentially in the grapple and rely on the operator's judgment to determine the remaining capacity of the grapple at any moment prior to transporting.

Today's forestry and construction equipment is becoming more complex with higher expectations for reliability. Monitoring productivity can reduce costly inefficiencies. A machine that does not optimize the payload transported can result in a loss of potential savings. Additionally, an operator may not be present to monitor capacity if the machine is operating autonomously. What is needed, therefore, is a system to guide an operator of the work vehicle, or the work vehicle directly in efficient operation.

SUMMARY

A grapple payload volume utilization system and method are disclosed. In one aspect of the disclosure, the grapple payload volume utilization system comprises a frame, a boom assembly, an image capture device, and a controller. The frame includes a ground-engaging mechanism. The boom assembly is coupled to the frame wherein the boom assembly includes an arch section pivotally coupled to the frame, a boom section pivotally coupled to the arch section, and a grapple pivotally coupled to the boom section. The arch section is moveable relative to the frame by an arch actuator. The boom section is moveable relative to the arch section by a boom actuator. The grapple is movable by a grapple actuator. The image capture device is coupled to one of the frame and the boom assembly wherein the image capture device has a field of view that includes the grapple and is configured to output image data of the grapple. The controller includes a processor and a non-transitory computer readable medium having a program instruction permitting the controller to monitor the grapple arms. The program instruction, when executed, causes the processor of the controller to do the following steps.

In a first step, the processor receives the image data of the grapple from the image capture device. The processor then determines the grapple volume based on a position of the grapple arms relative to each other. In another step, the processor identifies an object of interest between the grapple arms from the image data, and subsequently determines a characteristic of the object of interest. The processor calculates a grapple volume utilization based on the characteristic, and performs an action associated with the work vehicle based in part on the grapple volume utilization and the characteristic of the object of interest. The characteristic of the object of interest may include a girth, a cross-sectional size, a material, or a diameter.

The performed action may include determining a remaining capacity of the grapple; notifying an operator of the remaining capacity of grapple; suggesting an action based on the remaining capacity and a characteristic of the object of interest; calculating a productivity value; and re-orienting one or more of a boom and a grapple head for a repeated calculation of the grapple volume utilization.

In one implementation of the disclosure, the position of the grapple arms is determined from the image data.

In another implementation of the disclosure, the position of the grapple arms is determined from an extension sensor of the grapple actuator wherein the extension sensor of the grapple actuator indicates a tong angle relative to the grapple head.

Additionally, the position of the grapple arm may be determined by a sensing device having a sensing path between a frame of the work vehicle and the grapple. The sensing device is configured to output a signal indicative of a distance between the frame and a frame facing surface of the grapple.

Alternatively, the position of the grapple arm may be determined by a sensing device having a sensing path between a boom of the work vehicle and the grapple. The sensing device may be configured to output a signal indicative of a distance between the frame and a frame facing surface of the grapple.

The method of monitoring a grapple payload volume utilization for a work vehicle includes the following steps. In a first step, the method includes receiving image data of the pair of grapple arms from an image capture device coupled to the work vehicle. Next, the method includes determining a grapple volume based on a position of the grapple arms relative to each other. And object of interest is identified within the grapple arms of the image data. The method then includes determining one or more characteristics of the object of interest. Next, the method includes calculating a grapple volume utilization based on the one or more characteristics, and performing an action associated with the work vehicle based at least in part on the grapple volume utilization.

Performing the action may include determining a remaining capacity of the grapple, notifying an operator of the remaining capacity of the grapple, and suggesting an action based on the remaining capacity and a characteristic of the object of interest. Then the method includes calculating a productivity value, and re-orienting one or more of the boom and grapple head for a repeated calculation of the grapple volume utilization.

The above features and advantages and other features and advantages of the present teachings are readily apparent from the following detailed description of the best modes for carrying out the teachings when taken in connection with the accompanying drawings.

DETAILED DESCRIPTION

Figure 1:
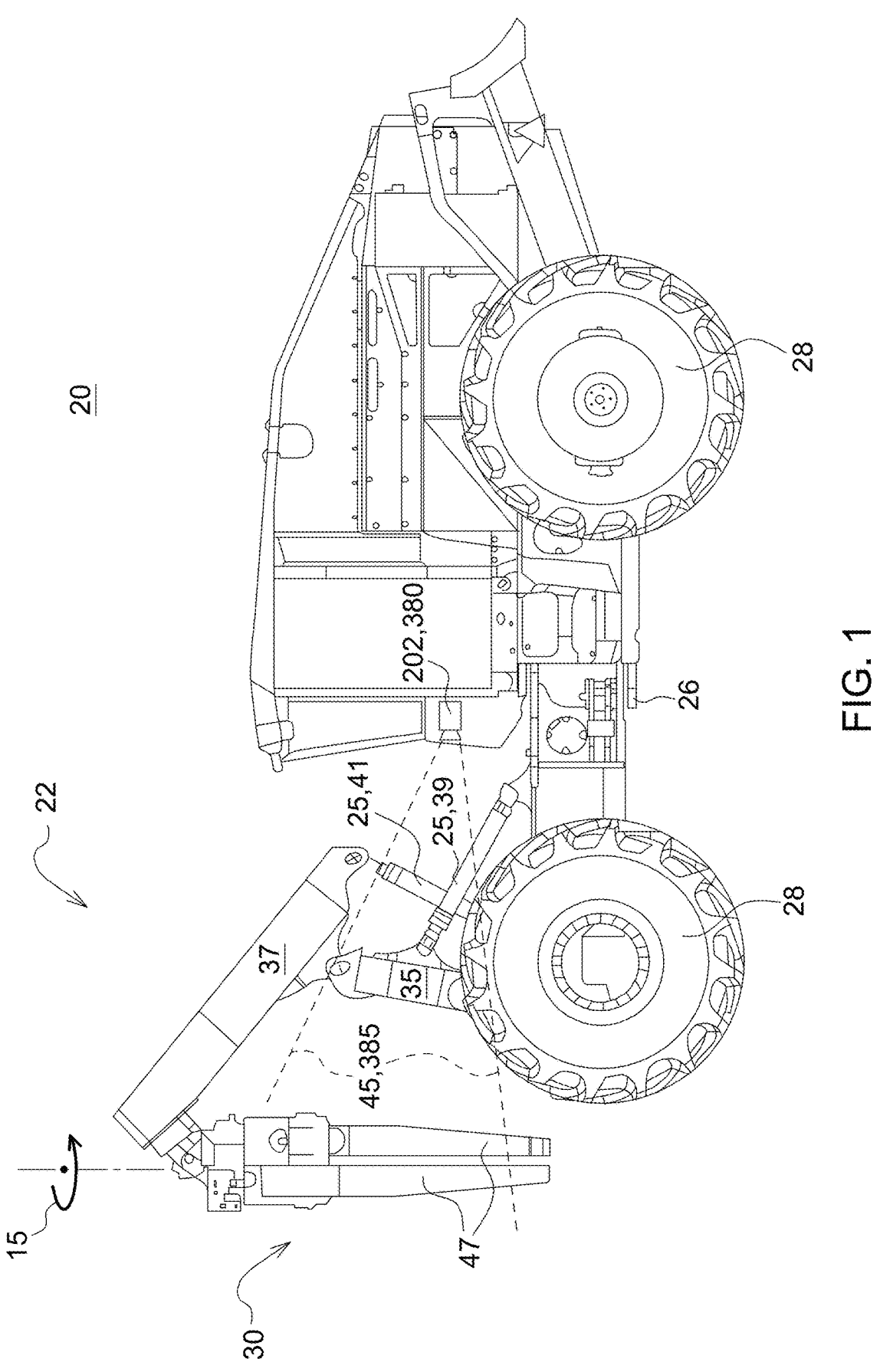
FIG. 1 is a side view of a work vehicle, a grapple skidder.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, "controller" is intended to be used consistent with how the term is used by a person of skill in the art, and refers to a computing component with processing, memory, and communication capabilities, which is utilized to execute instructions (i.e., stored on the memory 90 or received via the communication capabilities) to control or communicate with one or more other components. In certain embodiments, the controller 66 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 66 may be in communication with other components on the work vehicle 20, such as hydraulic components, electrical components, and operator inputs within an operator station of an associated work vehicle. The controller 66 may be electrically connected to these other components by a wiring harness such that messages, commands, and electrical power may be transmitted between the controller 66 and the other components. Although the controller 66 is referenced in the singular, in alternative embodiments the configuration and functionality described herein can be split across multiple devices using techniques known to a person of ordinary skill in the art.

The controller 66 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 90 may include any non-transitory/tangible medium which participates in providing data or computer-readable instructions. The memory 90 may be non-volatile or volatile. Non-volatile media may include, for example, optical or magnetic disks and other persistent memory. Example volatile media may include dynamic random-access memory (DRAM), which may constitute a main memory. Other examples of embodiments for memory 90 include a floppy, flexible disk, or hard disk, magnetic tape or other magnetic medium, a CD-ROM, DVD, and/or any other optical medium, as well as other possible memory devices such as flash memory.

The controller 66 includes the tangible, non-transitory memory 90 on which are recorded computer-executable instructions, including a monitoring algorithm 92. The processor 88 of the controller 66, or the boom and grapple controller 67, is configured for executing the monitoring algorithm 92. The monitoring algorithm 92 implements a method of monitoring the boom assembly 22 of the work vehicle 20.

As such, a method 600 may be embodied as a program or algorithm operable on the controller 66. It should be appreciated that the controller 66 may include any device capable of analyzing data from various sensors, comparing data, making decisions, and executing the required tasks.

Figure 3:
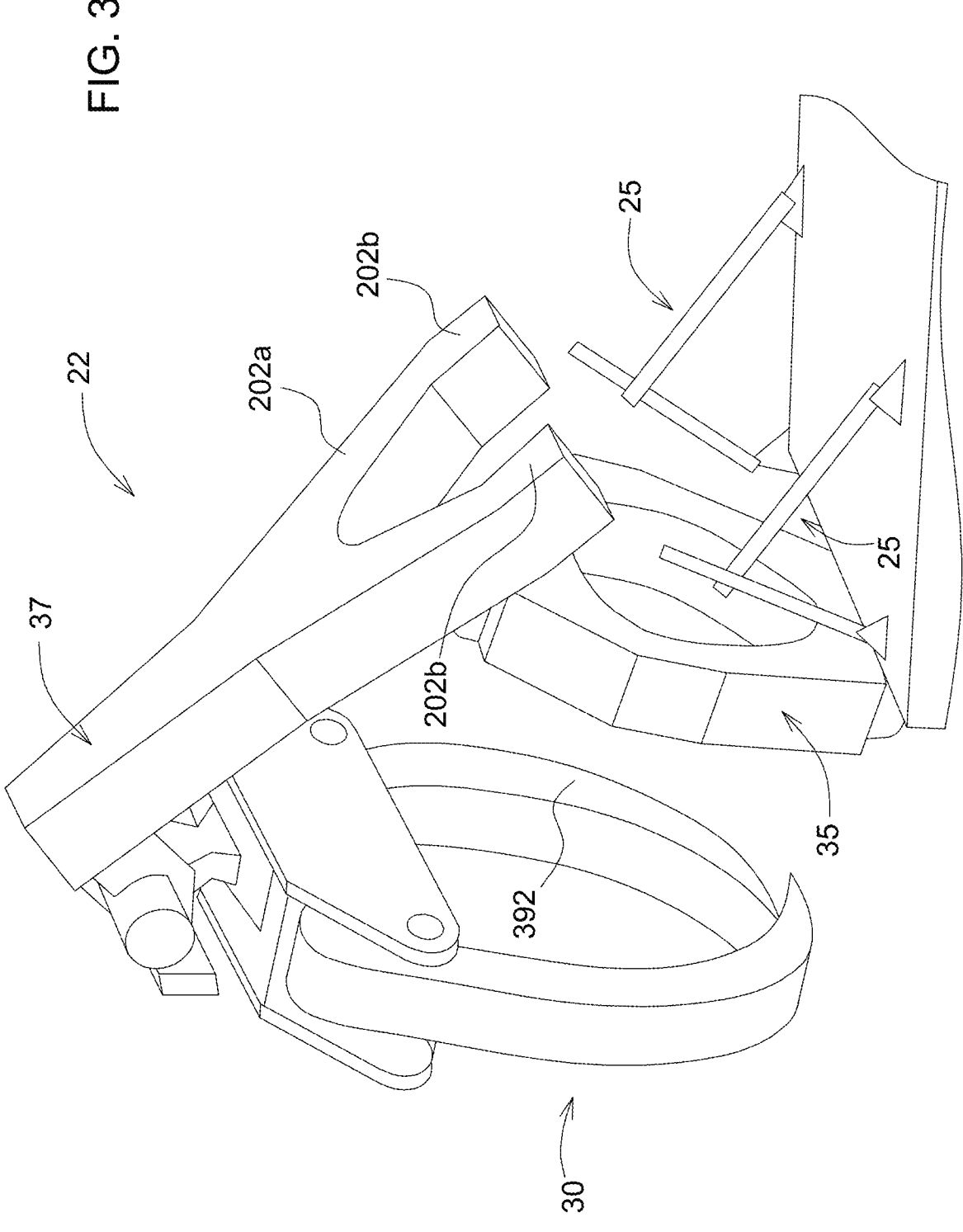
FIG. 3 is a perspective view of a portion of the boom assembly with the implement shown here as a grapple skidder.

Referring now to the drawings and with specific reference to FIGS. 1 and 3, an implement (shown here as a grapple 30) may be coupled to a work vehicle 20 by a boom assembly 22 wherein the boom assembly 22 may be moved by various actuators 25 to accomplish tasks with the implement, shown here as a grapple 30. Note that the actuators 25 may be electric or hydraulic. Although hydraulic cylinders are repeatedly referenced throughout, an electric actuator may be interchangeable with a hydraulic actuator. Discussion herein will focus on the example application of moving an implement 30 wherein the work vehicle 20 is configured as a grapple skidder. As shown in FIG. 3, a perspective view of the work vehicle 20, the grapple 30 is used for moving a payloads such as felled trees and processed logs wherein the grapple uses a pincer type movement. With respect to the present disclosure, work vehicles 20 may be configured to be any form of attachment where the payload 32 is retrieved cumulatively prior to transport and wherein the area in a cross-section of the payload can be translated to an implement capacity.

The disclosed grapple payload volume utilization system 200 comprises a frame 26 with a ground-engaging mechanism 28, a boom assembly 22, an image capture device 202, and a controller 66. The boom assembly 22 is coupled to the frame 26 and includes an arch section 35, a boom section 37, and a grapple 30. The arch section 35 is pivotally coupled to the frame 26 and moveable relative to the frame 26 by an arch actuator 39. The boom section 37 is pivotally coupled to the arch section 35 and moveable relative to the arch section 35 by a boom actuator 41. The grapple 30 is pivotally coupled to the boom section 37 and movable by a grapple actuator 43. The image capture device 202 is coupled to one of the frame 26 and the boom assembly 22. The image capture device 202 has a field of view 45 that includes the grapple 30 and is configured to output image data 204 of the grapple 30.

In a first configuration, an image capture device 202 may be placed on either side of the boom oriented towards the implement. These image capture devices 202 are rigidly coupled to the boom such that the distance to the implement may be calculated from movement of the boom. In a second embodiment, the image capture device 202 may be positioned in the gap between the arch and the boom allowing a centered view of the implement. In a third embodiment shown in FIG. 1, the image capture device 202 may be positioned in a forward portion of the work vehicle frame. For example, the image capture device 202 may be enclosed by the grill of a front facing surface of the work vehicle frame wherein an opening in the grill is created for a sensing path creating a field of view of the implement.

Figure 2:
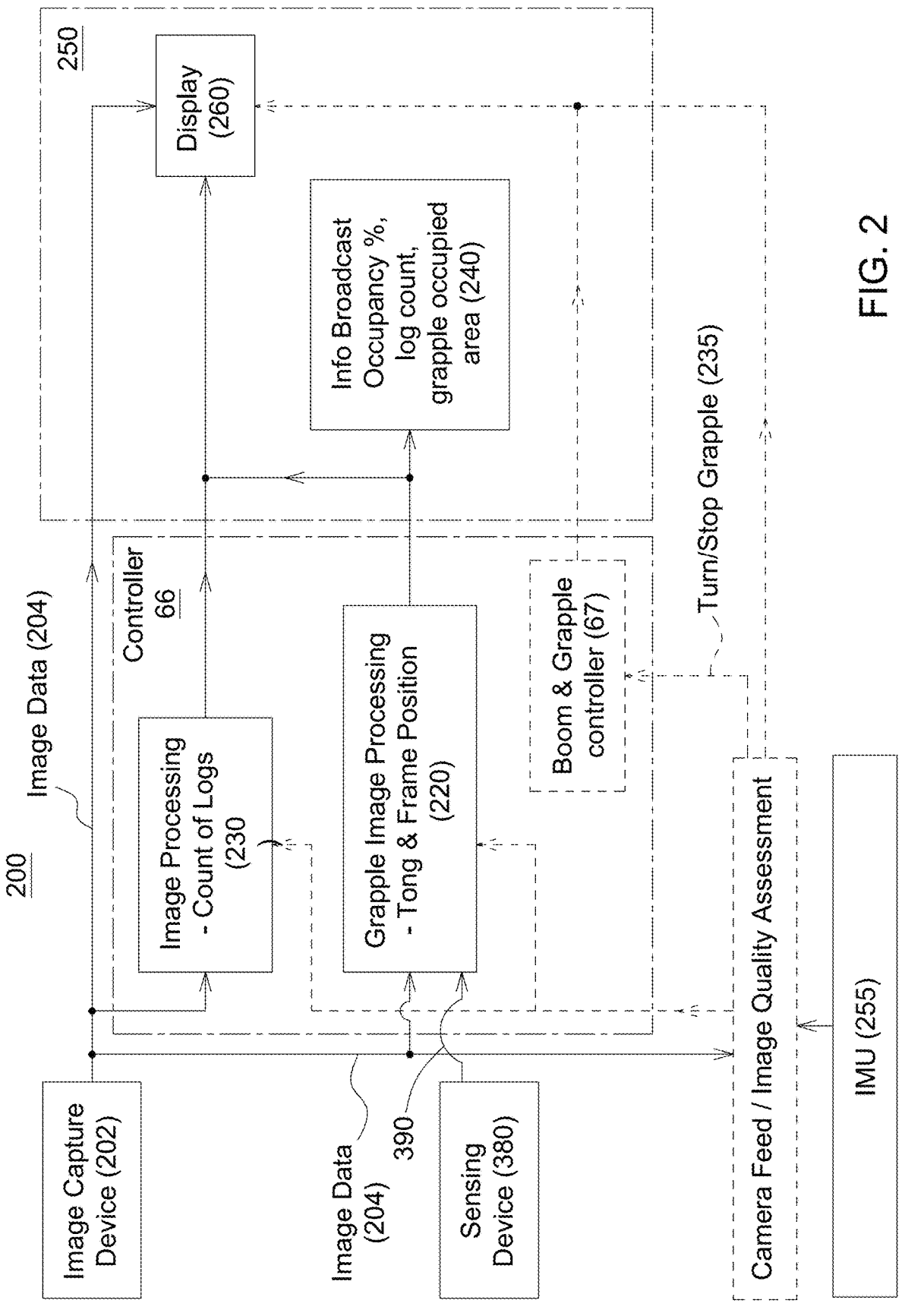
FIG. 2 is a block diagram of the system architecture and the flow in computing grapple payload volume monitoring system.

FIG. 2 is a schematic of the grapple payload volume utilization system 200 with the monitoring algorithm permits the controller 66 to monitor the grapple arms 47. The program instruction, when executed, causes the processor 88 to perform the following steps. In step 210, the controller 66 receives the image data 206 of the grapple 30 from the image capture device 202. Next in step 220, it determines a grapple volume 401 (shown in FIG. 4B) based on a position of the grapple arms 47 relative to each other. Then the controller 66 identifies an object of interest 400 between the grapple arms 47 from the image data 204, determines one or more characteristics of the object of interest 400 as shown in step 230, calculates a grapple volume utilization as shown in step 240; and performs an action 250 associated with the work vehicle 20 based at least in part on the grapple volume utilization in step.

The action 250 associated with the work vehicle 20 based at least in part on the grapple volume utilization includes determining 231 a remaining capacity of the grapple, notifying 232 an operator of the remaining capacity of the grapple, suggesting 233 an action based on the remaining capacity and a characteristic of the object of interest, calculating 234 a productivity value, and re-orienting 235 one or more of the boom and the grapple head for repeatedly calculating the grapple volume utilization. In another embodiment, payload weight may also be accounted for when calculating the productivity value.

Figure 4A:
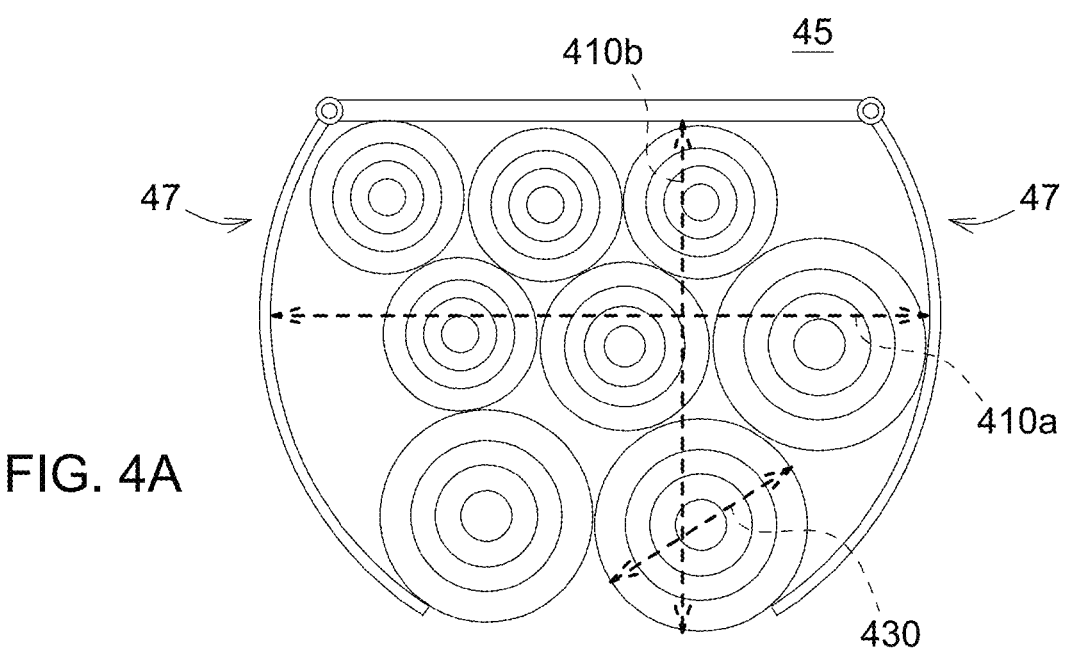
FIG. 4A is a schematic illustrating an embodiment of a grapple in the field of view with full occupancy of the grapple.
Figure 4B:
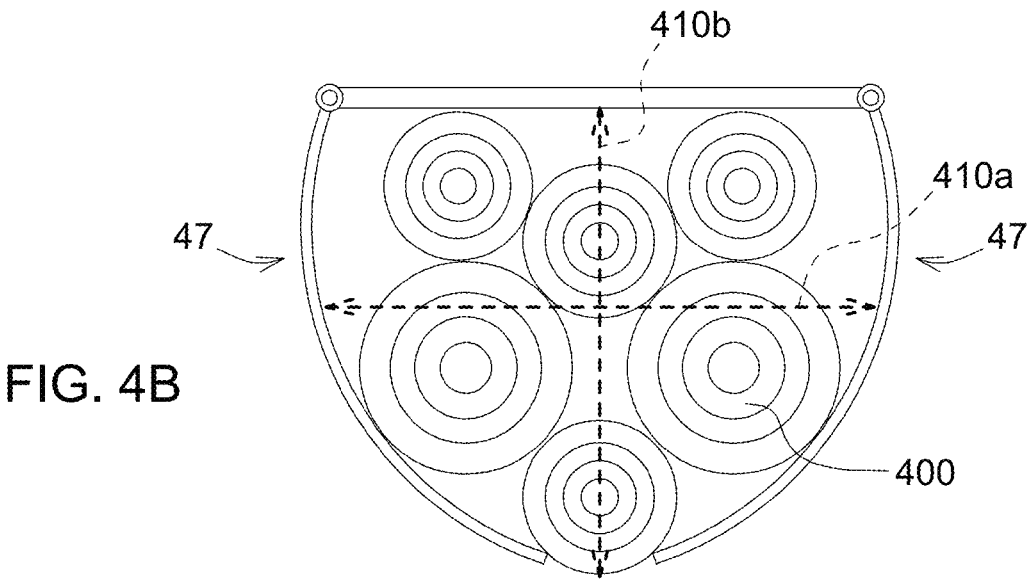
FIG. 4B is a schematic illustrating an embodiment of a grapple in the field of view with a partial occupancy of the grapple.
Figure 4C:
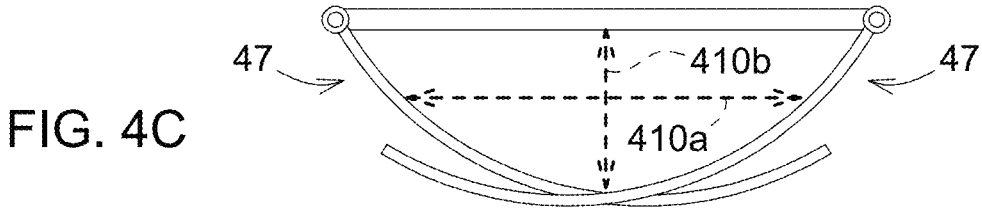
FIG. 4C is a schematic illustrating an embodiment of a grapple in the field of view with zero occupancy.

FIGS. 4A through 4C illustrate a schematic of the grapple 30. The grapple 30 may include a base 310, left and right grapple arms 47 and left and right hydraulic cylinders. The base 410 is coupled to the distal portion of the boom section 268. The proximal ends of the left and rights tongs (i.e. the grapple arms 47) are controllable by the left and right hydraulic cylinders to open and close the grapple 30. The left hydraulic cylinder 340 has a head end coupled to the base 310, and a piston end coupled to the proximal end of the left tong. The right hydraulic cylinder has a head end coupled to the base 310, and a piston end coupled to the proximal end of the right tong. The operator can control extension and retraction of the left and right hydraulic cylinders to open and close the grapple arms 47. When the left and right hydraulic cylinders are retracted, the proximal ends of the left and right tongs are brought closer together, which pulls apart the distal ends of the left and right tongs which opens the grapple arms 47. When the left and right hydraulic cylinders are extended, the proximal ends of the left and right tongs are pushed apart, which brings together the distal ends of the left and right tongs which closes the grapple arms 47. The operator can retract the left and right tongs to open the grapple 30 to surround a payload 32 (e.g. trees or other woody vegetation), and then extend the left and right tong cylinders to close the grapple 30 to grab, hold and lift the payload 32 so the machine can move it to another desired location. Another actuator may be located directly above the base 310 of the grapple and thereby enabling the grapple 30 to turn in a yaw direction 15 (shown in FIG. 1). FIG. 4A illustrates the tongs open at approximately a ninety percent extension of the actuator, with a near 100% of log carrying capacity. FIG. 4B illustrates the tongs open at approximately a fifty percent capacity and FIG. 4C illustrates the tongs at a zero percent capacity with the tongs overlapping. The program instructions may have predefined thresholds correlating the relative placement of the right and left tongs in the image data to define a minimum capacity threshold (i.e. no payload), a maximum capacity threshold, and the percent capacities therebetween.

The image data may be used to identify a characteristic of an object of interest 400. A characteristic of the object of interest can include one or more of a type of log, a cross-sectional size 410 of the log, a material 420 of the log, and a diameter 430 of the log. Several image analysis techniques may be applied for each image to enable the processor to segment the payload (e.g. logs) within the image data to derive the desired information. The program instructions include processing a static image and segment the object of interest individually by discriminating from noise. In one exemplary embodiment, a pixel-oriented segmentation algorithm can be used for segmenting each individual log, and the grapple arms holding the individual logs. The processor may superimpose edges to identify the log diameter, log count, and the volume capacity of the grapple arms. The position of the grapple arms 47 may be determined from the image data 204. The cross-sectional area between the grapple arms is indicative of what percentage of full capacity the grapple arms are open. The processor may then use a calculated average of the log diameter to extrapolate the remaining number of logs the grapple head has capacity of engaging with, in addition to productivity calculations for each transport of the payload.

Figures 5A, 5B:
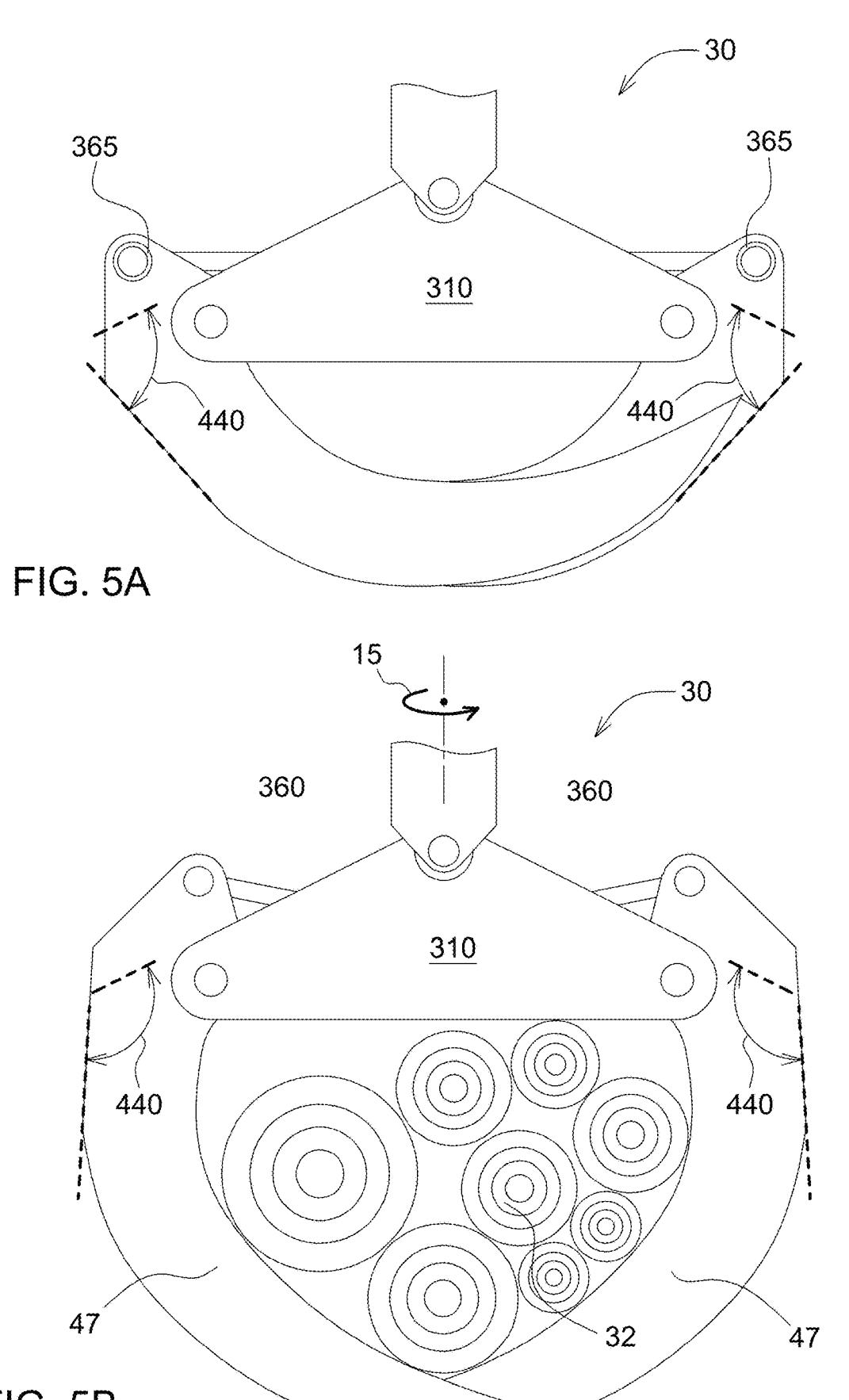
FIG. 5A is a schematic of a tong angle with the tongs in a first position.
FIG. 5B is a schematic of a tong angle with the tongs in a second position.

FIGS. 5A and 5B show a schematic of the grapple 30 wherein the position of the grapple arms allows for calculation of the area between the grapple to indicate potential grapple volume. The position of the grapple arms 47 may also be determined from an extension sensor 360 of a grapple actuator (340, 350), the extension sensor 360 of the grapple actuator can be indicative of a tong angle 440 relative to the grapple head 370. For example, the grapple actuators may comprise of linear actuators driving each respective tong. Referring to a position of a point on the actuator may be used to determine the degree to which the grapple actuator extended, and therefore allowing for calculations of the tong arms. Alternatively, the position of the grapple arms can be derived from the angular movement about a pivot point measured using a rotary sensor 365. In another embodiment use of an orientation sensor such as a gyro or an inertial measurement unit (IMU) 255 communicatively coupled to the controller may be used. These tong position sensor examples are by no means limited to the embodiments discussed.

The position of the grapple arms 47 may be determined by a sensing device 380 having a sensing path 385 between the frame 26 of the work vehicle 20 and the grapple 30. The sensing device 380 may be configured to output a signal 390 indicative of a distance between the frame 26 and a frame facing surface 392 of the grapple 30. In an exemplary embodiment where the sensing device 380, the contactless or the image capture device 202) may be positioned such that its sensing path projects into the field of view 45. In a first embodiment shown in FIG. 3, the sensing device may be location on either or both portions of the boom arm 202a or someone therebetween 202b.

The position of grapple arm may be determined by a sensing device 380 having a sensing path 385 between a boom of the work vehicle 20 and the grapple 30. The sensing device 380 may be configured to output a signal indicative of a distance 390 between the frame 26 and a frame facing surface 392 of the grapple 30. In another embodiment shown in FIG. 1, the sensing device 380 may located near the grill in a forward portion of the frame of the work vehicle. An opening may be made in the grill if the sensing device is located behind it. Positioning at this location can provide measurement from a stationary point with a clear field of view of the grapple head.

Figure 6:
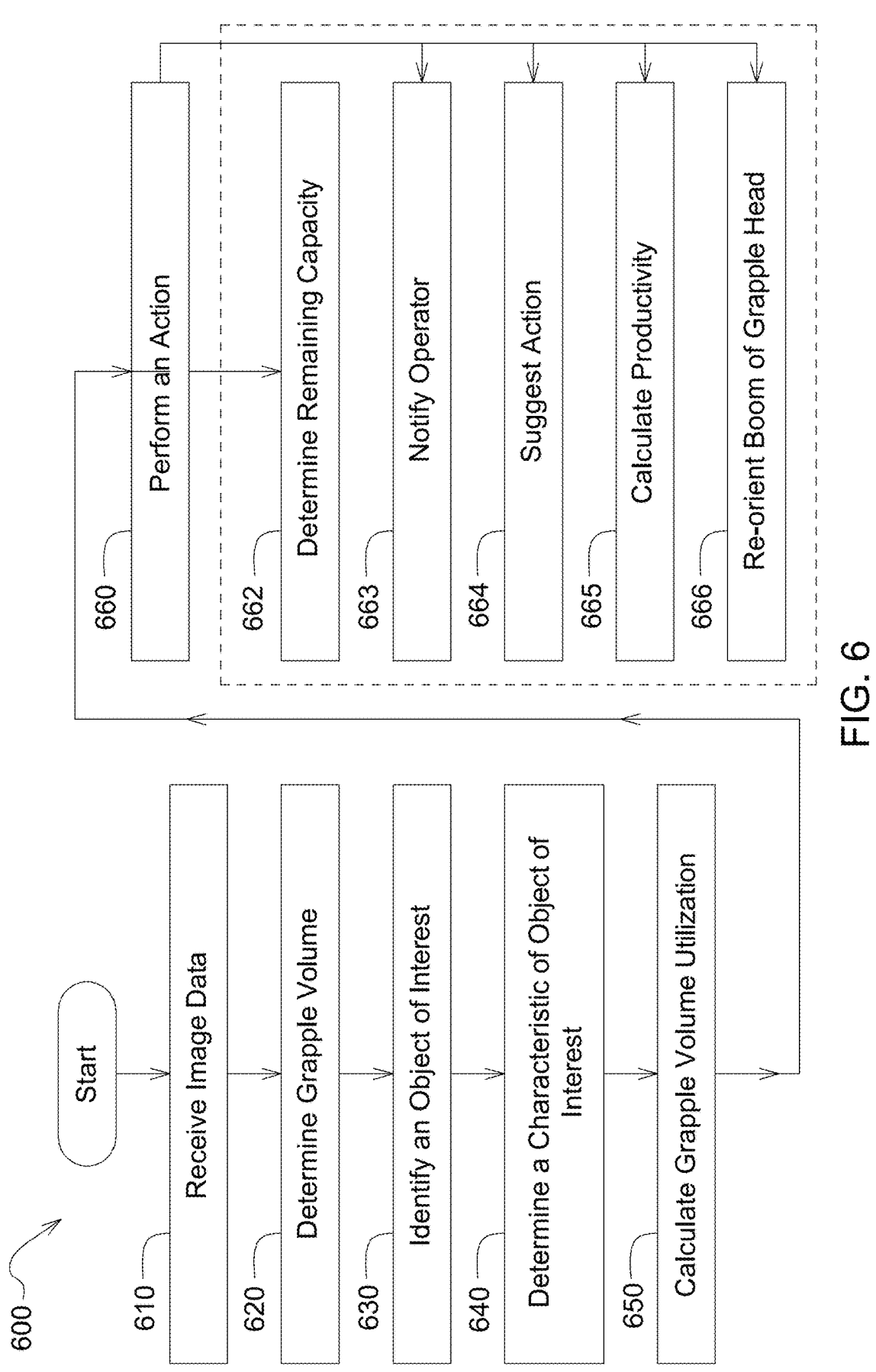
FIG. 6 a method of monitoring grapple payload utilization for a work machine.

Now turning to FIG. 6, a method 600 of monitoring a grapple payload volume utilization for a work vehicle comprises the following steps. In a first step 610, the method includes receiving image data of a pair of grapple arms from an image capture device coupled to the work vehicle. Step 620 includes determining a grapple volume based on a position of the grapple arms relative to each other. In step 630, the method includes identifying an object of interest within the grapple arms of the image data. Next in step 640, the method includes determining one or more characteristics of the object of interest. Next in step 650, the method involves calculating a grapple volume utilization based on the one or more characteristics. Zhen in step 660, the work vehicle performs an action associated with the work vehicle based at least in part on the grapple volume utilization.

The performed actions associated with the work vehicle include determining a remaining capacity of the grapple in step 662, notifying an operator of the remaining capacity of the grapple in step 663, for example on a display 260, suggesting an action based on the remaining capacity and a characteristic of the object of interest in step 664; calculating a productivity value in step 665, and re-orienting one or more of a boom and a grappled head for a repeated calculation the grapple volume utilization in step 666. The productivity value 665 may provide information relating to the progress of the operation to help guide, navigate, and/or control an autonomous or a semi-autonomous work vehicle based on the grapple volume utilization. That is, the work vehicle may continue accumulating payload prior to transporting to a payload processing center, or immediately begin transport to the payload processing center. In some examples, the work vehicle may receive guidance, navigation, and/or control information from a local operator or from a remote operation via a control stations, and/or from another device with a user interface.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A non-transitory computer readable medium comprising:

a program instruction for permitting a monitoring system having a controller to indicate a grapple volume utilization of a work vehicle, the work vehicle including a pair of grapple arms for moving a payload, the program instructions when executed causing a processor of the controller to:

receive an image data of the pair of the grapple arms from an image capture device coupled to the work vehicle;

determine a grapple volume between the grapple arms based on a position of the grapple relative to one another;

identify an object of interest within the grapple arms of the image data;

determine one or more characteristics of the object of interest;

calculate a grapple volume utilization based on the one or more characteristics; and re-orient one or more of a boom and a grapple head based at least in part on the grapple volume utilization in real-time based on the calculated grapple volume utilization and the characteristics of the object of interest.

2. The non-transitory computer readable medium of claim 1, wherein the program instructions when executed further cause the processor of the controller to determine the position of the grapple arms from the image data using a machine vision algorithm that segments the object of interest from the background and discriminates between multiple objects within the grapple.

3. The non-transitory computer readable medium of claim 1, wherein the program instructions when executed further cause the processor of the controller to determine the position of the grapple arms from an extension sensor of a grapple actuator, the extension sensor of the grapple actuator indicative of a tong angle relative to a grapple head.

4. The non-transitory computer readable medium of claim 1, wherein the program instructions when executed further cause the processor of the controller to determine the position of the grapple arms by a sensing device having a sensing path between a frame of the work vehicle and the grapple, the sensing device configured to output a signal indicative of a distance between the frame and a frame facing surface of the grapple.

5. The non-transitory computer readable medium of claim 1, wherein the program instructions when executed further cause the processor of the controller to determine the position of the grapple arm by a sensing device having a sensing path between a boom of the work vehicle and the grapple, the sensing device configured to output a signal indicative of a distance between the frame and a frame facing surface of the grapple.

6. The non-transitory computer readable medium of claim 2, wherein a characteristic of the object of interest includes one of a girth of the object of interest, a cross-sectional size of the object of interest, a material of the object of interest, and a diameter of the object of interest.

7. A grapple payload volume utilization system comprising: a frame with a ground-engaging mechanism;
   a boom assembly coupled to the frame, wherein the boom assembly includes:
   an arch section pivotally coupled to the frame and moveable relative to the frame by an arch actuator,
   a boom section pivotally coupled to the arch section and moveable relative to the arch section by a boom actuator; and
   a grapple pivotally coupled to the boom section and moveable by a grapple actuator;
   an image capture device coupled to one of the frame and the boom assembly, the image capture device having a field of view including the grapple and configured to output an image data of the grapple; and
   a controller including a processor and a non-transitory computer readable medium having a program instruction permitting the controller to monitor the grapple arms, the program instruction when executed cause the processor of the controller to:
   receive the image data of the grapple from the image capture device;
   determine a grapple volume based on a position of the grapple arms relative to each other;
   identify an object of interest between the grapple arms, from the image data;
   determine a characteristic of the object of interest;
   calculate a grapple volume utilization based on the characteristic; and re-orient one or more of a boom and a grapple head based in part on the grapple volume utilization and the characteristic of the object of interest
   wherein the system is configured to provide real-time operator guidance based on the calculated grapple volume utilization and the determined characteristic of the object of interest.

8. The grapple payload volume utilization system of claim 7, wherein the program instructions when executed cause the processor of the controller to determine the position of the grapple arms from the image data using a machine vision algorithm that segments the object of interest from the background and discriminates between multiple objects within the grapple.

9. The grapple payload volume utilization system of claim 7, wherein the program instructions when executed cause the processor of the controller to determine the position of the grapple arms is determined from an extension sensor of a grapple actuator, wherein the extension sensor of the grapple actuator is indicative of a tong angle relative to a grapple head.

10. The grapple payload volume utilization system of claim 7, wherein the program instructions when executed cause the processor of the controller to determine the position of the grapple arms by a sensing device having a sensing path between a frame of the work vehicle and the grapple, wherein the sensing device configured to output a signal indicative of a distance between the frame and a frame facing surface of the grapple.

11. The grapple payload volume utilization system of claim 7, wherein the program instructions when executed cause the processor of the controller to determine the position of the grapple arm by a sensing device having a sensing path between a boom of the work vehicle and the grapple, wherein the sensing device configured to output a signal indicative of a distance between the frame and a flame facing surface of the grapple.

12. The grapple payload volume utilization system of claim 7, wherein a characteristic of the object of interest comprises one of a girth of the object of interest, a cross-sectional size of the object of interest, a material of the object of interest, and a diameter of the object of interest.

13. A method of monitoring a grapple payload volume utilization for a work vehicle comprises:
   receiving an image data of a pair of grapple arms from an image capture device coupled to the work vehicle;
   determining a grapple volume based on a position of the grapple arms relative to each other;
   identifying an object of interest within the grapple arms of the image data;
   determining one or more characteristics of the object of interest;
   calculating a grapple volume utilization based on the one or more characteristics; and
   re-orienting one or more of a boom and a grapple head based at least in part on the grapple volume utilization
   wherein the method further comprises providing real-time operator guidance based on the calculated grapple volume utilization and the determined characteristic of the object of interest.

14. The method of claim 13 wherein the position of the grapple arms is determined from one of the image data using a machine vision algorithm that segments the object of interest from the background and discriminates between multiple objects within the grapple, and an extension sensor of a grapple actuator indicative of a tong angle relative to a grapple head data.

15. The method of claim 13 wherein the position of the grapple arm is determined by a sensing device having a sensing path between a frame of the work vehicle and the grapple, the sensing device configured to output a signal indicative of a distance between the frame and a frame facing surface of the grapple.

16. The method of claim 13 wherein the position of the grapple arm is determined by a sensing device having a sensing path between a boom of the work vehicle and the grapple, the sensing device configured to output a signal indicative of a distance between the frame and a frame facing surface of the grapple.

17. The method of claim 13 wherein a characteristic of the object of interest includes one of a girth of the object of interest, a cross-sectional size of the object of interest, a material of the object of interest, and a diameter of the object of interest.

* * * * *